United States Patent [19]

Mohrmann

[11] Patent Number: 5,325,530
[45] Date of Patent: Jun. 28, 1994

[54] CONTROLLER FOR SEQUENTIAL PROGRAMMING TOOLS EXECUTED IN A PARALLEL COMPUTING ENVIRONMENT

[75] Inventor: Richard L. Mohrmann, Kingston, N.Y.

[73] Assignee: International Business Machines Corporation, Armonk, N.Y.

[21] Appl. No.: 10,700

[22] Filed: Jan. 29, 1993

[51] Int. Cl.$^5$ .............................................. G06F 15/16
[52] U.S. Cl. ...................................... 395/700; 371/19; 364/DIG. 1; 364/281.4; 364/267.91
[58] Field of Search .................... 371/19; 395/575, 700

[56] References Cited

U.S. PATENT DOCUMENTS

| | | | |
|---|---|---|---|
| 5,212,792 | 5/1993 | Gerety et al. | 364/DIG. 1 |
| 5,226,162 | 7/1993 | Daw | 395/700 |
| 5,255,385 | 10/1993 | Kikuchi | 395/700 X |
| 5,274,797 | 12/1993 | Barlow et al. | 395/700 X |
| 5,287,511 | 2/1994 | Robinson et al. | 395/700 |

Primary Examiner—Thomas M. Heckler
Attorney, Agent, or Firm—Floyd A. Gonzalez; Robert L. Troike

[57] ABSTRACT

A controller (210) for controlling a plurality of sequential tools ($220_1, 220_2, \ldots, 220_n$), such as dbx debuggers (dbx tools), operating in a parallel computing system. The controller executes each of these sequential tools on an individual node ($245_1, 245_2, \ldots, 245_n$) of a parallel computing system (100). The controller associates each tool with a particular process ($230_1, 230_2, \ldots, 230_n$) of a user program executing on a particular node. Typically, each tool accumulates specific performance characteristics of its associated process as data and transfers the data to the controller for ultimate display to a programmer. In particular, the controller in combination with various dbx tools operating on various nodes in the parallel computing environment produces a parallel program debugger (pdbx). As pdbx, the controller sends commands to particular nodes to control the operation of each dbx tool executing on that particular node. Additionally, nodes can be grouped together to permit pdbx to simultaneously send commands to a group of nodes and effectuate group control of multiple dbx tools.

14 Claims, 3 Drawing Sheets

CONTROLLER FOR SEQUENTIAL PROGRAMMING TOOLS EXECUTED IN A PARALLEL COMPUTING ENVIRONMENT

BACKGROUND OF THE DISCLOSURE

1. Field of the Invention

The invention relates to tools used in performance monitoring of computer programs and, in particular, to a controller of sequential tools used to monitor performance of computer programs that are executed in a parallel computing environment.

2. Description of the Prior Art

Computer programmers widely use software tools to monitor the performance of computer programs while a computer system executes the programs. Typically, as the computer system executes a program, such tools collect specific result data, such as specific variable values or calculation results, from specific locations in the program. One such tool is a symbolic debugger (hereinafter simply referred to as a "debugger").

Computer programmers use debuggers as tools to identify mistakes or malfunctions in a computer program. More specifically, debuggers are used to detect, locate, isolate and eliminate errors in computer programs. In essence, a debugger is a special computer program capable of controlling execution of a computer program under test (hereinafter referred to as a "user program"). While controlling execution of a particular user program, a debugger monitors the operation of the user program by collecting, as the program executes, data concerning program performance. From this data, a programmer can determine whether mistakes or malfunctions have occurred during execution of the program.

One specific type of symbolic debugger is a so-called debugger extension (dbx) (hereinafter referred to as a dbx tool). The dbx tool is widely used by programmers of computers using a UNIX operating system (UNIX is a registered trademark of UNIX System Laboratories, Inc. of Summit, N.J.). One such UNIX operating system is the Advanced Interactive Executive (AIX) operating system produced by International Business Machines Corporation of Armonk, N.Y. (AIX is a trademark of International Business Machines Corporation of Armonk, N.Y.). This specific operating system is illustrative of the many types of operating systems which operate in conjunction with the dbx tool.

Generally, the dbx tool is a symbolic, command line oriented debugging program capable of debugging programs written in C, C++, Pascal, FORTRAN, or COBOL programming languages. The dbx tool allows a user to examine both object and core files while providing a controlled environment for executing a program. To facilitate the controlled environment, the dbx tool permits the user to set breakpoints at selected statements within the program. In this manner, the dbx tool executes the program up to the breakpoint and stops. Typically, at the breakpoint, the dbx tool displays to the programmer a particular result or variable arising from execution of the program up to that point. Alternatively, the dbx tool can execute a program one line at a time and display results as each line executes. Additionally, the dbx tool debugs programs using symbolic variables to collect data as the program executes and displays the variables in their correct logical format. As such, a programmer can quickly comprehend any errors within the program.

However, the dbx tool becomes very cumbersome and, at times, impossible to utilize in a parallel environment. A parallel computing environment generally comprises a plurality of computing units connected to one another through a computer network. Each computing unit in the parallel computing environment is known as a node. When a program is executed in such an environment, various program tasks which comprise the program are executed on various individual nodes. Each task is accomplished in parallel; data from those tasks are passed, along the network, from one task to another. The dbx tool is not designed to debug a program that is executed in such a parallel computing environment. In that regard, dbx tools can only debug an individual task, i.e., a program serially executing on a single individual node. Moreover, in order for a user to be able to enter commands to the dbx tools, each individual task must be executed on a node with an attached terminal. Because each node must be debugged individually, debugging is a tedious and time consuming process when applied to parallel programs that execute on many nodes. Additionally, some nodes in a parallel computing system, known as computing machines, may be embedded within the system, i.e., without direct terminal connections, and consequently, do not allow a dbx tool to be used at all. Moreover, because the various tasks are executed in parallel and pass information among themselves, an error occurring in a task not presently being debugged may be indicated as an error in the task being debugged. As such, the source of the error may not be immediately known to the programmer. Accordingly, the programmer may waste a significant amount of time attempting to correct an error in the program task presently being debugged, when in fact the error has occurred in another node.

Thus, a need exists in the art for a controller that enables sequential tools, such as the dbx tool, to be utilized in a parallel processing environment. Additionally, the command structures used by the controller should be similar to the dbx tool to enable computer programmers familiar with the widely used dbx tool to quickly understand the new controller.

SUMMARY OF THE INVENTION

Accordingly, an object of the invention is to provide a controller that functions in a parallel computing environment such that sequential tools designed for serial execution can be used in such a parallel computing environment.

Another object of the invention is to provide a controller that is capable of controlling a sequential debugger, specifically, a dbx debugger.

Yet another object of the invention is to provide a controller that uses familiar dbx tool commands to facilitate debugging programs in a parallel computing environment.

These and other objects are achieved in accordance with the present invention by a controller that controls a plurality of sequential tools. The controller executes each sequential tool on an individual node of a parallel computing system. The controller associates each tool with a particular process of a user program executing on a particular node. In this manner, a given individual sequential tool operates in a sequential manner in conjunction with a particular sequentially executed process. However, the controller controls the operation of the plurality of sequential tools individually and as a group. Typically, each tool accumulates specific performance characteristics of its associated process as data and transfers the data to the controller for ultimate display to a programmer.

Specifically, the inventive controller is intended to control a plurality of tools known as dbx debuggers or dbx tools. In essence, the controller in combination with a number of dbx tools, each operating on a respective number of nodes in a parallel computing environment, produces a parallel program debugger (pdbx). As such, pdbx controls each dbx tool operating on individual nodes of the parallel computing system. Special pdbx commands enable a programmer to control the dbx tools individually, or as a programmer defined group. These commands are similar to those presently used by dbx, therefore programmers familiar with dbx will not be unduly burdened to learn the commands for pdbx. Additionally, all the commands presently used to control dbx in a sequential environment are available for controlling the individual or grouped dbx tools in the parallel environment.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will realize that the teachings of my invention can be readily utilized to control sequential computer programming tools, of many varied kinds, that collectively operate on individual nodes in a parallel computing environment, also known as a parallel computing system. In general, my invention is a technique for interfacing individual programming tools executing on individual nodes within a parallel computing environment to a single control and monitoring node. The single control and monitoring node is typically a user terminal connected to a computer network that forms the parallel environment. In this manner, my invention controls, from a single user terminal, a plurality of tool programs each individually monitoring an individual portion of a user program operating on various separate nodes of the parallel computing system. However, to simplify the following discussion and for purposes of illustration, my present invention will be discussed in the context of controlling a plurality of dbx tools.

Figure 1:
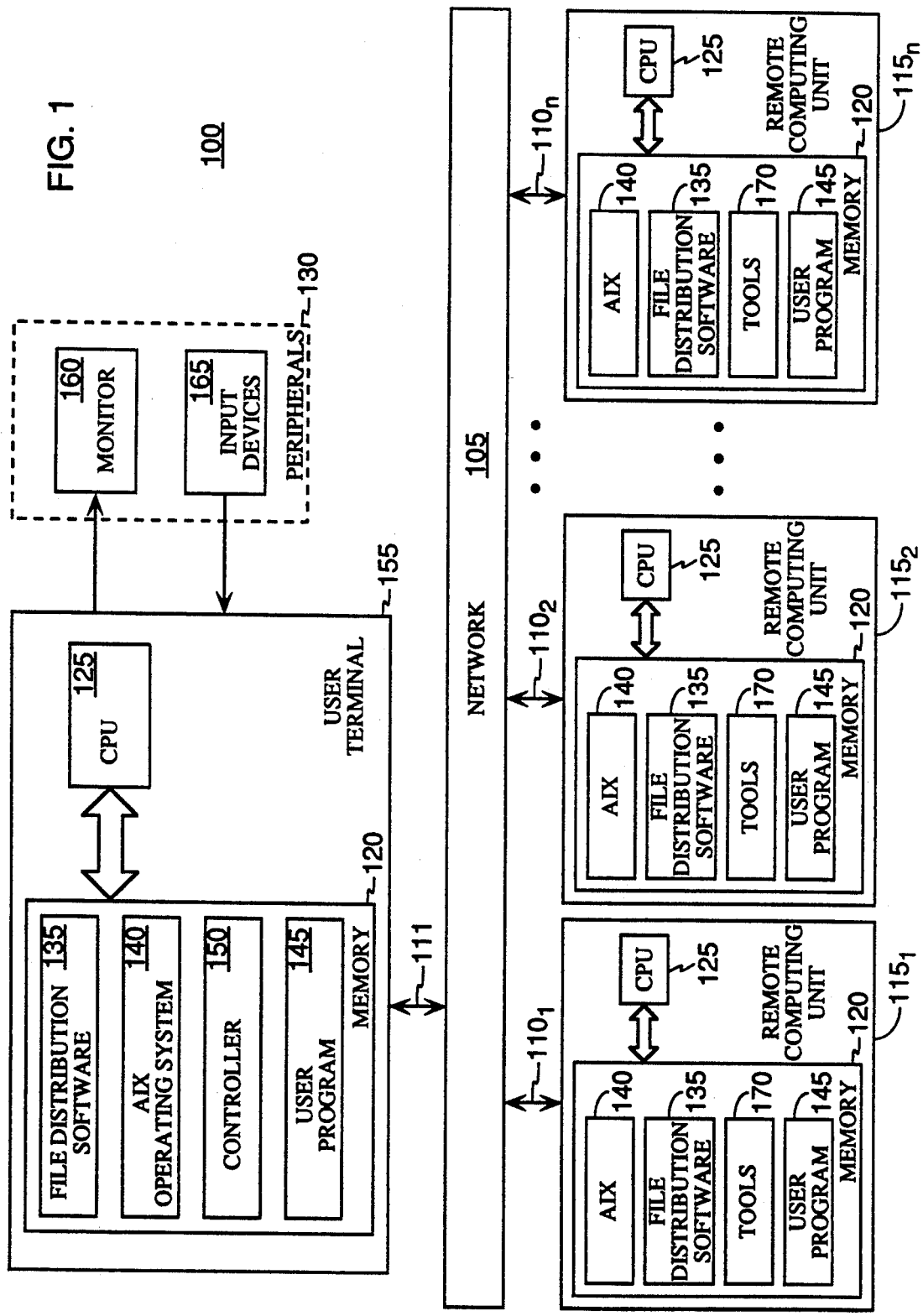
FIG. 1 is a block diagram of parallel computing system 100

FIG. 1 is a block diagram of parallel computing system 100. The parallel computing system contains a plurality of remote computing units $115_1$, $115_2$, . . . , $115_n$ and user terminal 155 all connected, via respective paths $110_1$, $110_2$, . . . , $110_n$ and 111, to network 105 (n being an arbitrary integer). User terminal 155 contains central processing unit 125, memory 120, and various peripherals 130; each remote computing unit 115, contains identical elements though, as shown, possibly without peripherals 130. Typically, user terminal 155 contains specific peripherals such as monitor 160 and input devices 165, with the latter exemplified by a keyboard and/or a mouse. Illustratively, the parallel computing system utilizes file distribution software 135 operating in conjunction with AIX operating system 140, both executing within the user terminal and in each remote computing unit, to produce the parallel environment. All the software is stored in memory 120 within the user terminal and the remote computing units. The file distribution software facilitates the use of a parallel environment in which computer programs may be executed on many computers. Specifically, such file distribution software enables each CPU 125 to access any file in memory within any node, i.e., promote file sharing.

Typically, in a parallel computing environment each individual computer attached to the network is known as a remote computing unit. Within this environment, the individual remote computing units share files and programs which are designed to execute in a parallel computing system. Through the parallel computing environment, these files and programs are distributed amongst all the remote computing units. Upon execution of a particular parallel program, each remote computing unit executes a portion of that parallel program. In this manner, those remote computing units presently executing the parallel program become nodes of the parallel computing environment. Each node will execute and complete a specific task. The results of that task are shared with the other tasks currently executing on various other nodes.

More specifically, remote computing units $115_1$, $115_2$, . . . , $115_n$ and user terminal 155 connect in a parallel fashion to network 105. Network 105 forms a backbone of the parallel computing environment. The user terminal forms an interface between the network and the programmer. Through the user terminal the programmer may execute a specific parallel program (illustratively user program 145) on the parallel computing system. In addition, a programmer, through user terminal 155, enters any necessary commands and executes, as necessary, various programming tools 170.

My invention, hereinafter controller 150, is stored in memory 120 within user terminal 155. A programmer executes controller 150 on user terminal 155 to control a plurality of individual tool programs 170. Each tool program 170 is executed on individual remote computing units $115_1$, $115_2$, . . . , $115_n$. Illustratively, each individual tool program is, for example, a serial program debugger known in the art as dbx, i.e., a dbx tool. When my inventive controller is used to control a plurality of the dbx tools, it is known as a parallel-dbx (pdbx) debugger, or simply as pdbx.

Figure 2:
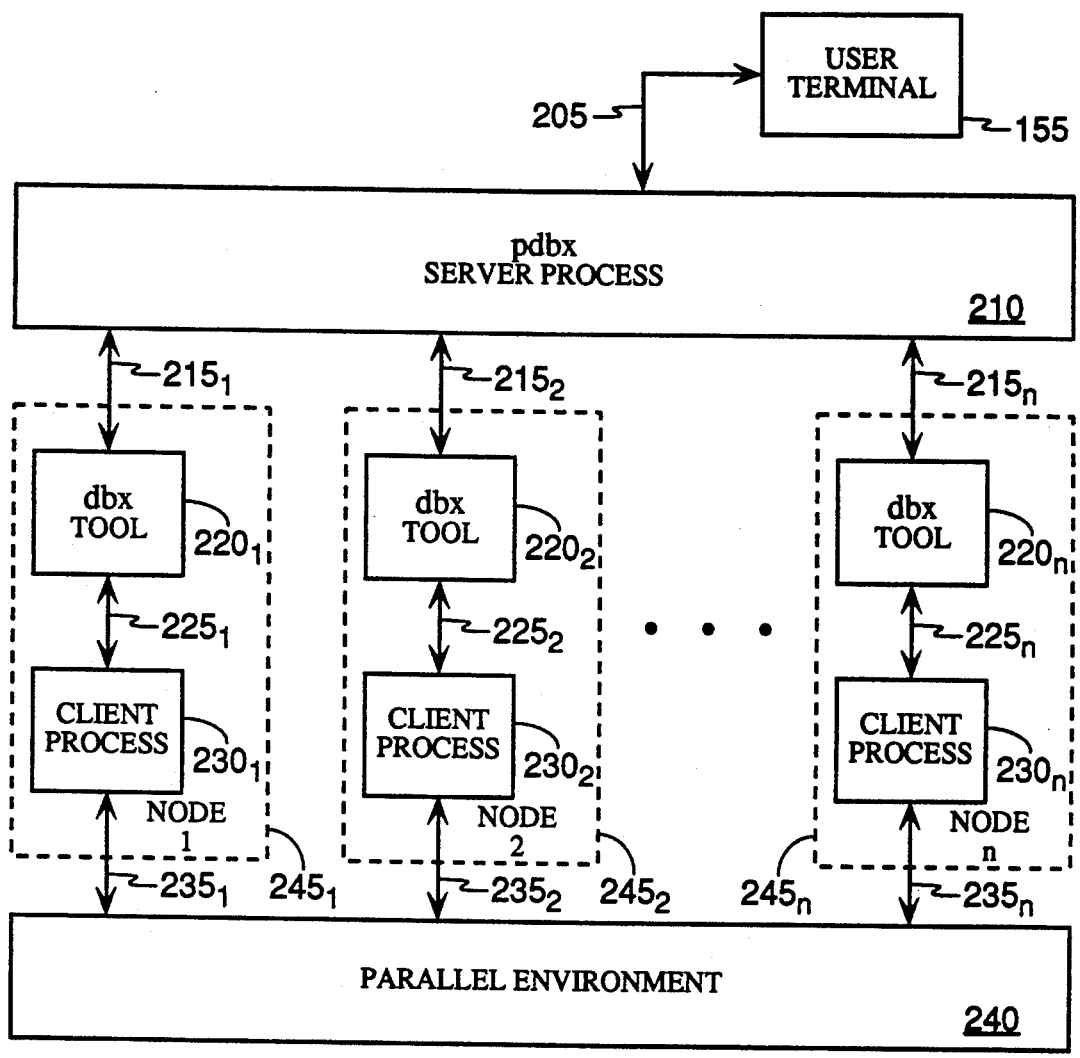
FIG. 2 is a block diagram depicting the interaction between parallel program debugger (pdbx) server process 210, program debugger (dbx) tools $220_1$, $220_2$ and $220_n$ and client processes $230_1$, $230_2$ and $230_n$, all operating in conjunction with a parallel computing environment (symbolized by block 240)

FIG. 2 is a block diagram depicting the logical interaction between pdbx server process 210 (executed pdbx), dbx tools $220_1$, $220_2$, . . . , $220_n$, corresponding client processes $230_1$, $230_2$, . . . , $230_n$ (individually executed user program tasks) and parallel environment 240. Each node $245_1$, $245_2$, . . . , $245_n$ contains an individual dbx tool and an associated client process connected to one another by paths $225_1$, $225_2$, . . . , $225_n$. All of the nodes interact, via paths $235_1$, $235_2$, . . . , $235_n$ with parallel environment 240 to permit sharing of files and information to facilitate parallel processing of the individual client processes. The pdbx server process controls, via paths $215_1, 215_2, \ldots, 215_n$, the operation of the dbx tools by issuing commands formatted in a manner that is understandable to each dbx tool 220. As such, the dbx tool 220, in turn, controls the operation of each client process 230. The manner in which the dbx tool controls a client process 230 is well known in the art, and therefore will not be discussed in detail. As a result of the pdbx server process 210 connection to each dbx tool, a programmer can control, by entering commands into user terminal 155, each dbx tool either individually or as a group. Thus, a programmer, through a single user terminal, may accomplish program debugging of a single client process, a subset of all the client processes or all the client processes at once.

When instructed by a programmer, the pdbx server process issues dbx tool commands to each node such that the dbx tool executing within each node is controlled individually. In response to the commands, the dbx tool sends answers, typically data or an acknowledgment that the command was accomplished, to the pdbx server process. The pdbx server process displays these answers on the monitor attached to user terminal 155. For example, a programmer may wish client process $220_2$ to step to a next line of code and execute that line of code. To do so, the programmer sends an instruction from user terminal 155, along path 205, to pdbx server process 210 instructing the pdbx server process to accomplish the desired operation. In response, the pdbx server sends a "step" command to dbx tool $220_2$. In response to this command, dbx tool $220_2$ will cause client process $230_2$ to step to and execute the next line of code in the user program. Importantly, none of the other client processes are effected by this operation.

Both the pdbx server and the dbx tools respond to, and answer in, a data stream format that is known in the art as standard input/output (stdio). The data streams that comprise stdio are known as standard input (stdin), standard output (stdout) and standard error (stderr). The specific characteristics of these data streams are irrelevant to the understanding of my invention and form no part thereof.

Figure 3:
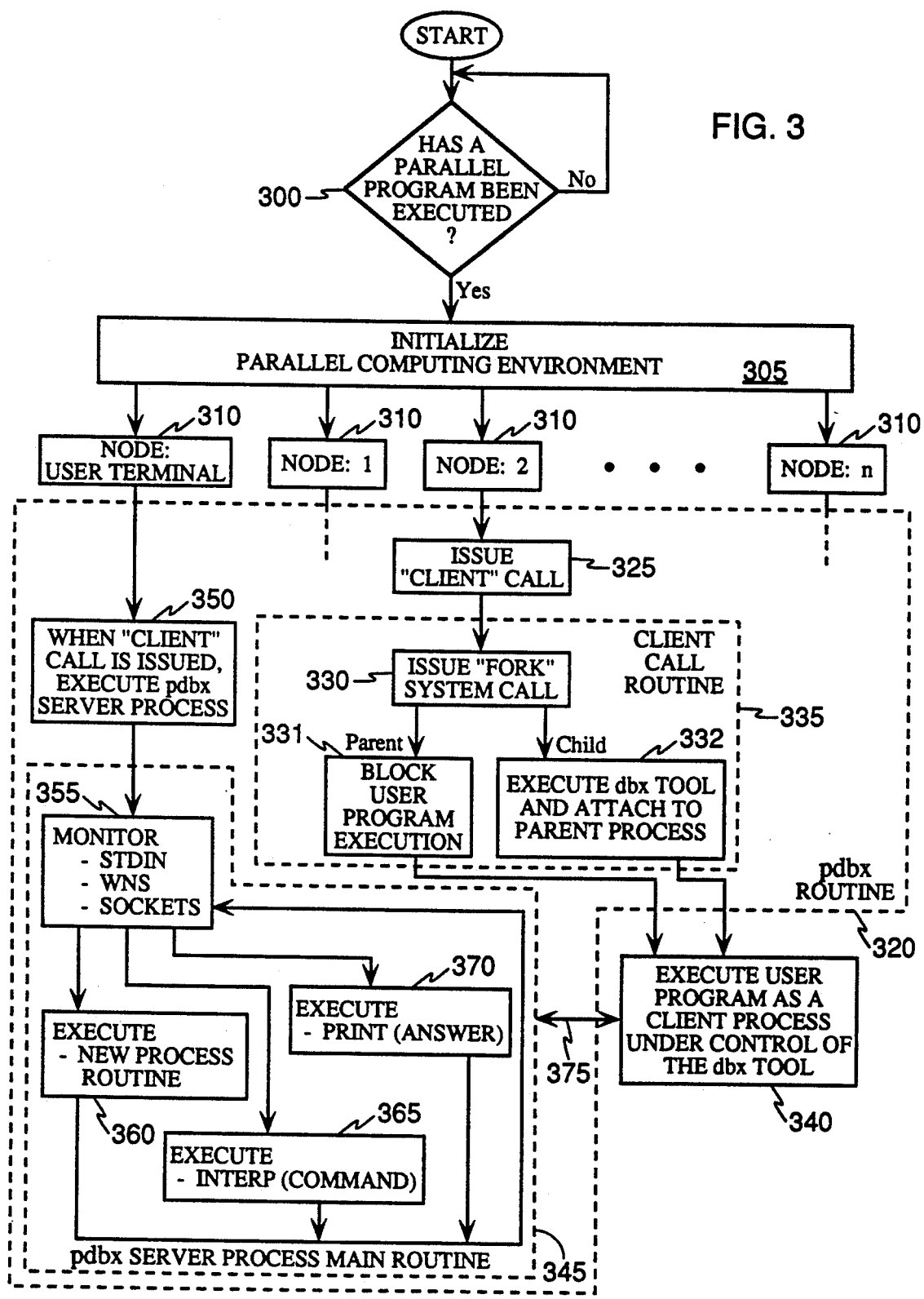
FIG. 3 is a high level flow chart of pdbx routine 320 for implementing my inventive controller.

FIG. 3 is a high level flow chart depicting the operation of my inventive controller. In general, the controller, in the form of a pdbx routine 320, is executed partially on the user terminal as a pdbx server process and partially on each of a plurality of nodes in a parallel computing system as a client call process. The connection between each client process and each dbx tool is established using a command in the pdbx routine before the beginning of the user program (unexecuted client process). The command is known as a "client" call. In response to a "client" call, a client call routine (process) blocks the user program from executing while the client call routine executes and attaches a dbx tool to the user program. Subsequently, the block is removed and the user program executes under the control of the dbx tool. Additionally, "client" calls are issued on other nodes such that dbx tools are executed on other nodes within the parallel computing environment as needed, i.e., whenever a user program is about to be executed on another node to perform a particular task. After the dbx tool attaches to the user program, commands from the user terminal to the pdbx server are passed to the dbx tool to control and monitor the execution of the user program. All responses from the client process (executed user program) are passed, via the dbx tool, to the pdbx server process for display at a user terminal. Consequently, the pdbx server process controls all of the individually executed dbx tools. In this manner, the dbx tool, a serial debugger, is adapted to operate in a parallel environment.

Specifically, at step 300, the user terminal waits in a loop until a programmer executes a parallel user program. When the user executes a parallel user program, the user terminal automatically initializes the parallel computing environment. During initialization, various tasks (client processes) to be performed by the user program are assigned to a number of nodes in a parallel computing system. Each client process is assigned a unique node number upon which that process is to be executed. Illustrative individual nodes are shown in blocks 310. To clearly differentiate the node to which the user terminal is connected from the other nodes, that node is labeled NODE: USER TERMINAL. The remaining nodes are successively labeled with a unique integer value, such as 1, 2, 3, 4 up to n.

For simplicity, FIG. 3 depicts steps of routine 320 for the user terminal node and for node 2 only. However, the other nodes, specifically 1, 3, 4, up to n, execute the same routine steps as depicted for node 2.

After the parallel computing system is established and prior to executing the parallel user program, a number of process steps are performed to execute and attach individual dbx tools to each client process on each node. These process steps are shown as pdbx routine 320. Additionally, the pdbx routine executes the pdbx server process on the user terminal node.

To facilitate executing a dbx tool and attaching it to a client process, at step 325, the parallel environment issues a "client" call in each node, e.g., 1, 2, 3 and so on up to n. The "client" call executes client call routine 335 which issues, at step 330, a "fork" system call. As is well known in the art, a "fork" system call creates an image (duplicate) of the presently executing process. The process which issued the "fork" system call is known as a parent process and the image is known as a child process. At a point in the child process just before the user program is about to be executed, the child process executes, at step 332, a dbx tool and attaches the dbx tool to the parent process. Simultaneously, the parent process blocks, at step 331, the execution of the user program until the dbx tool is attached to the parent process by the child process. Specifically, the pseudo-code for client call routine 335 is as follows:

```
pdbx_client
{
    if (pid=fork( )!=0) {
        /* I'm the parent process */
        suspend /* wait until dbx
                attaches */
    } else {
        /* I'm the child */
        establish socket connection to a
            well-known socket (wks)
        redirect stdio through socket using
            dup
        exec(dbx) attaching the dbx
            tool to parent
    }
}
```

In operation, the client call routine first issues a "fork" system call to the operating system, e.g., the term "fork" in the if statement. Upon completion of the "fork" system call, the operating system returns two process identification numbers (pid); the pid for the child process is "0" and the parent process pid is an integer value. The client call routine performs a different operation for each respective pid. Consequently, if the pid is not equal to "0", i.e., represented in the pseudo-code as pid?=0, the process is the parent process and the routine suspends execution of that process. In this manner, the user program is not executed, i.e., the user program is blocked until the dbx tool attaches to the parent process.

Alternatively, if the pid is "0", the process is the child process and the routine establishes a socket at a specific address. In general, a socket is a communication portal to a specific process. In this instance, the specific process is a pdbx server process discussed in detail below. Sockets and their use for establishing communications paths between processes are well known in the art, thus a detailed discussion of sockets is not necessary to understand my invention. Illustratively, the socket having a specific address is hereinafter referred to as a "well known socket (wks)". As is discussed below, the wks is used for making all socket connections to the server process.

Subsequent to establishing a connection to the wks, the client call routine redirects all the stdio data for this node to the wks using the well known "dup" command. In this manner, all input and output data transferred between this node and the pdbx server process initially must pass through the wks. Finally, the client call routine issues an exec system call to execute a dbx tool in node 2. The dbx tool thus connects to the parent process. In this manner, the dbx tool controls any program executed by the parent process, e.g., a client process. Additionally, a communication pathway, via wks, between the dbx tool and the pdbx server process is symbolized by path 375.

When the "client" call is issued, pdbx routine 320 simultaneously executes, at step 350, pdbx server process main routine 345 (hereinafter referred to as "main routine 345"). Once executed, the main routine monitors, at step 355, a socket connecting to the input devices of the user terminal (stdin), the wks, and other sockets. The main routine uses a "select" system call to monitor the various sockets and select a socket that becomes active. Consequently, whenever activity is sensed on any of these sockets, the main routine performs, at steps 360, 365 and 370, three respective functions including (1) handling new client processes as they are executed, (2) interpreting commands from an input device, (3) processing answers from each dbx tool as the dbx tools return information requested by a programmer. Pseudo-code for main routine 345 appears below.

```
main( )
{
    Parse command line options
    Initialize data structures
    Set up and post wks
    Process commands file
    fdset={stdin, wks}

/* wait until one member of fdset is
       ready for io*/
    who=select(fdset)
    if (who==wks)
        new_process( );

/* user entered a command*/
    else if (who==stdin) {
        command=read(stdin);
```

-continued

```
        interp(command);
    }
    /* input received from a socket connection */
    else {
        answer=read(who);
        print(who: answer);
    }
}
```

With reference to the above pseudo-code, the parse command line options function executes a number of initialization commands. These commands are typically pre-set by the user to instruct the pdbx server process to accomplish certain operations before allowing any user program to execute. They are typically user defined as a convenient method of customizing pdbx. The nature of these commands and their associated operations are unimportant to the operation of my invention; hence, they will not be specifically discussed.

The initialize data structures function initializes the data structures that are associated with the main routine. Some of the data structures that are initialized at this point are: groups, active list, aliases and the like. These data structures are discussed in detail below. Those skilled in the art will readily understand that initializing data structures is a common component of most any program and does not warrant further discussion.

The set up and post wks function creates a socket in a manner that is well known to those skilled in the art. The main routine ensures that the specific address of that socket is well known to the parallel computing system. In this manner, any new client process and dbx tool in the parallel environment will access this socket address to connect to the pdbx server process. Consequently, each new client process executed in the parallel computing system can interact with the pdbx server process and be debugged by a dbx tool. Immediately after a dbx tool connects to wks, the socket connection is moved to another socket address. This permits other processes to access wks as necessary. The details of the wks connection and the subsequent moving of that connection are discussed below in more detail.

The process commands file function executes certain user defined initialization file(s) used to initialize individual dbx tools. These files typically contain commands that enable a user to customize the environment in which dbx operates. The specific nature of these commands is defined by each individual user and is unimportant to understanding my invention.

The fdset=(stdin, wks) program line establishes an active list of file descriptors, hereinafter referred to as the active list. At this point, the active list contains a standard input descriptor (stdin) and a wks descriptor. Thus, the pdbx server process only expects activity from stdin, input commands from the user terminal input devices, and from wks, whenever a new process connects to that socket. The use and expansion of the active list is discussed below.

The select function, performed by a "select" system call, establishes an input/output (I/0) multiplexing scheme having the active list of file descriptors as the object of the function. In this manner, the main routine will wait until one of the file descriptors in the active list, currently stdin and wks, develops a pending input or output, e.g., a user types a command on the keyboard or the wks becomes active. If, for example, the wks becomes active due to a new connection by a process, "who" will equal the wks descriptor and the main routine executes new_process() routine 360 (discussed below). Alternatively, if stdin becomes active due to a command being entered from the keyboard (or other input device), "who" will equal the stdin descriptor. In response, the main routine reads the command from the keyboard and execute interp routine 365 (discussed below). However, if the activity is not from either stdin or wks, then the activity must be an answer from a dbx tool previously requested to accomplish an operation. In this instance, known as print(answer) routine 370, the main routine reads which task is returning an answer, i.e., reads the node (task) number, and prints, on the computer screen, the node number along with the answer.

When a new node, i.e., a dbx tool and a client process, connects to the wks, the socket connection must be moved as quickly as possible to another address location because there is a finite limit to the number of connections that can be pending in queue for wks access. Quick relocation of the socket minimizes the chance of another node being refused access to the wks because of an excessive queue. The routine, known as new_process routine 360, which accomplishes the socket transfer is summarized in the following pseudo-code.

```
new_process( )
{
    create new socket
    copy connection info from wks to new socket
    add new node number to active list
    add new node to "all" group
    fdset=fdset union with { new socket }
    send appropriate breakpoints/traces to the
        new node
}
```

The foregoing new_process routine creates a new socket at a new address location and copies the connection information from the wks to the new socket. In this manner, the wks is free to accept connections from another node. The node number of the new node is added to the active list such that the main routine will respond to any activity from the new node. The new node number is also added to the "all" group. The reason for doing so will become evident when node grouping is discussed below. The new_process routine redefines the list of active file descriptors, fdset, to include the socket connected to the new node. Additionally, breakpoints are sent to the new node to ensure that the parallel computing environment has executed all the software on that node up to a point just before the user program is to begin executing. In this manner, the dbx tool attaches to the user program (client process) at an appropriate starting point. These breakpoints, as well as all breakpoints, are monitored and stored within pdbx such that a global list of all breakpoints in all presently active nodes is compiled. In this manner, when a new node is added, the breakpoints used in client processes on other nodes can be sent to the dbx tool associated with the client process on the new node. Thus, if a programmer so desires, all the client processes can be controlled to stop at the same point in the user program.

Once a node has been added to the active list, the dbx tool, which is controlling the client process therein, can be sent commands from the keyboard. However, both commands for the dbx tool and commands for pdbx server process are entered through the same keyboard.

Therefore, interp routine 365 is used to separate the commands such that pdbx commands are executed within the user terminal and the dbx tool commands are sent to an appropriate dbx tool. As such, the interp routine accomplishes the interpretation of any command from the keyboard. The main routine initiates interp routine 365 whenever the main routine senses activity from stdin. The following is a pseudo-code representation of interp routine 365.

```
interp(command)
{
    switch(command)

case "on"          : change context
    case "group add"   : create new group
    case "group list"  : show groups
    case "group delete": delete group
    case "unhook"      : release process(es)
    case "hook"        : re-attach process(es)
    case "stop/trace"  : add to breakpoint list
    otherwise:
        send command to all processes in
            current context (the dbx tool
            command)
}
```

The pseudo-code above searches a command entered from the keyboard for a match to one of the seven illustrative pdbx commands. These seven pdbx commands are meant to be illustrative of the types of commands that are useful to control pdbx and in no way should be construed to limit the number of possible commands available to a user. If a match is not found, the command is assumed to be a dbx tool command. In that case, the routine sends the command to the appropriate node running the dbx tool. How the appropriate node, i.e., a node that is in context, is known is discussed below as each pdbx command is discussed.

The "on" command produces what can be thought of as a pointer to a particular node or group of nodes. For instance, nodes are designated by a unique integer value and the "on" command points to a particular node by using "on n", where "n" is an integer value designation of a particular node. A node that is presently pointed at is known as being "in context".

The "on" command can be used to send the dbx tool commands to a particular node without changing the node presently in context, i.e., producing a temporary change of context. For example, if the present context is 2, and the command "on 4 print task.id" is entered, the task id from node 4 would be returned to the user terminal and printed. However, the context remains as node 2. In this manner, only a single operation is accomplished by the dbx tool at node 4. Any subsequent dbx tool command is sent to node 2, unless, of course, the context is altered.

However, if a user follows an "on" command with a dbx tool command on a line by itself, such as "print task.id", the interp routine changes the context to that of the previous "on" command and then passes the dbx tool command to the node indicated in that previous "on" command. In response, pdbx prints, to the screen of the monitor, the task.id for the node presently in context. Consequently, the context is that of the last (previous) "on" command.

The "group add" command provides a very important feature of the invention. The "group add" command allows a specific group of nodes to be created from individual nodes. For example, if a user enters the command "group add slaves 1 2 3", the pdbx server process produces a group named "slaves" that contains nodes "1, 2 and 3". Subsequently, that group can be treated as an individual node. For example, the command "on slaves" generates a context including nodes 1, 2 and 3 as a group. Thus, a subsequently entered dbx tool command is sent to all three nodes, and a response will return from all three nodes. In addition to user definable groups, the pdbx server process maintains a group, namely "all", that contains the node numbers of all the active nodes. The default group can be used to send dbx tool commands simultaneously to all of the presently executed dbx tools.

The command "group list" produces a list of all the presently established groups and their members. This command enables a user to list all the previously created groups.

The "group delete" command enables a user to delete a presently established group. For example, the command "group delete slaves" would delete the aforementioned "slaves" group.

The "unhook" command detaches a particular client process running on a particular node or group of client processes running on a group of nodes from a respective dbx tool(s). Conversely, the "hook" command reattaches a previously detached client process to its respective dbx tool. These commands are particularly useful in debugging routines which operate in a master-slave relationship, in particular, routines having a single master routine and a number of slave routines. For instance, initially, the dbx tools may be attached to all the processes, e.g., the master and all the slaves. Thus allowing each process to be stepped through its respective code line by line using the "on" pdbx command and the "step" dbx tool command. However, stepping through the various programs individually is a tedious process. To facilitate a quick debugging procedure, a user can detach the slave processes from their respective dbx tools using the "unhook" command, e.g., "unhook 2 3 4". The dbx tool attached to the master process can then be stepped through the master routine line by line. As each slave process is called from the master process and executed, the entire slave process will run, complete and return its result to the master process. Then, the master process can be stepped to the next line of code using the "step" dbx tool command. If, however, a particular slave process returns an errant result to the master process, a programmer can point, using the "on" command, to the particular node on which that slave process executes and reattach, using the "hook" command, its associated dbx tool. In this manner, the software can be executed and both the master process, and the slave process that generated an errant result, can be stepwise executed. This procedure significantly increases the speed at which master and slave processes are debugged over debugging each individual process separately.

The "stop/trace" command is in reality two separate dbx tool commands, e.g., "stop" and "trace", which, in addition to producing a dbx function, also cause pdbx to accomplish an operation. Specifically, a "stop" command establishes a breakpoint in the client process at a specific line. For example, "on 5 stop 200" would cause the client process on node 5 to execute to line 200 and stop. Furthermore, a trace command causes dbx to indicate every time a client process executes a specific line of code. For example, "on 5 trace 500" would cause the dbx tool to report to the pdbx server process every time the client process on node 5 executes line 500 of its code. Whenever either of these dbx tool commands are used, the pdbx server process stores in a global list of all the active processes, the line numbers associated with each stop and trace command. In this manner, when a new node is added to the active list, a user can send the presently used stop and trace line numbers to the new client process within that new node. Thus, the new client process will stop and also trace in the same manner as the client processes presently executing on other nodes.

Interp routine 365 sends, via path 375, all other commands not matching those discussed above to the dbx tool(s) currently in context. The dbx tool processes the command, accomplishes the function required by the command and returns the result, via path 375, to the pdbx server process. The manner in which a dbx tool operates and the commands used to control that operation are well known in the art. Further details concerning the operation of dbx tool debuggers are not necessary to understanding the operation of my invention. However, for further details concerning dbx tool operation, the reader should consult the "IBM AIX Version 3 for RISC System/6000 Commands Reference", Volume 1, pages 512-573 (©1990, International Business Machines Corporation.

The foregoing description has been focused upon apparatus and methods for enabling a well-known serial debugger such as dbx to be used in a parallel computing environment. However, the inventive concept which enables the serial debugger to be used in a parallel environment can be applied to any serial tool that provides a command line interface. As such, during establishment of the parallel environment, any such serial tool can be used by issuing an "exec" command to a desired tool, rather than to the dbx tool. In this manner, a serial tool will be executed on each node of the parallel computing system. All the pdbx commands discussed above will apply to any such tool operating in this environment. In other words, the "on" command is used as a pointer to enter commands to a particular tool, the "hook and "unhook" commands are used to detach and re-attach the tool(s) to a particular process(es), "group" is used to group nodes so that commands can be sent to more than one node at a time, and so on.

Alternatively, the controller can be used to execute other programs, such as "shell" programs, in a controlled manner on individual nodes within a parallel computing environment. Generally, UNIX shell programs form interfaces between a UNIX operating system and a user terminal. By using my controller to execute shell programs on embedded nodes that normally do not have terminal connections, my controller enables terminal inputs to be passed from the keyboard through my controller to any node presently in context. Thus, a connection can be made to a terminal no matter where a particular node is located within a parallel computing system.

Although a single embodiment which incorporates the teachings of the present invention have been shown and described in detail herein, those skilled in the art can readily devise many other varied embodiments that still incorporate these teachings.

I claim:

1. A computer system for executing a parallel user program and multiple sequential tools in a parallel computing environment comprising:

a user terminal;

a plurality of remote computing units;

an operating system located in said user terminal having means responsive to said parallel user program for forming said parallel computing environment by connecting said remote computing units in parallel with said user terminal, each said unit and said user terminal forming a node in said parallel computing environment;

means, located in each said unit, for executing a task of said parallel user program under control of said operating system to execute said parallel user program concurrently in more than one of said units;

means, located in each said unit, for executing one of said sequential tools and a task under the control of said sequential tool;

means, located at at least one of said nodes, for issuing commands to block said parallel user program from executing, to execute at least one of said sequential tools and to attach said sequential tool to said parallel user program such that said sequential tool controls the execution of one of said tasks; and controlling means responsive to said commands for executing a controller process on said user terminal node within said parallel computing environment, wherein said controller process controls each of said sequential tools executing thereat.

2. The system of claim 1 wherein said means for issuing commands further comprises means for issuing, from at least one of said nodes, a "client" call that invokes a "fork" system call to produce a parent process means for blocking said parallel user program from executing and a child process means for operating one of said sequential tools and connecting said sequential tool to said parent process means.

3. The system of claim 2 wherein said controlling means further comprises means for grouping said sequential tools such that a single command controls a plurality of said sequential tools.

4. The system of claim 2 wherein said controlling means further comprises:

means for adding additional nodes to said parallel computing environment executing an additional sequential tool on each new node, and controlling said additional sequential tool via said controlling means.

5. The system of claim 1 wherein said sequential tool is a symbolic serial debugger means for serially debugging said task.

6. In a computer system operating in a parallel computing environment having a user terminal with an operating system, multiple sequential tools and a plurality of remote computing units, each said unit having means for executing a task of a parallel user program being executed concurrently on more than one of said units under the control of said operating system, and means for executing one of said sequential tools and said task under the control of said sequential tool, a method for controlling said multiple sequential tools comprising:

forming, in response to said parallel user program being executed by said operating system on said computer system, said parallel computing environment by connecting said remote computing units in parallel with said user terminal to permit said operating system to execute said parallel user program concurrently in more than one of said units, each said unit and said user terminal forming a node in said parallel computing environment;

issuing, from at least one of said nodes, commands to block said parallel user program from executing, to execute a sequential tool and to attach said sequential tool to said parallel user program such that said sequential tool controls the execution of one of said tasks; and executing, in response to said commands, a controller process on said user terminal node within said parallel computing environment, wherein said controller process controls each of said sequential tools executing thereat.

7. The method of claim 6 wherein said sequential tool is a symbolic serial debugger that serially debugs said task.

8. The method of claim 7 further comprising the steps of:

parsing commands from an input device into control process commands for controlling said controller process and sequential tool commands for controlling said sequential tools;

directing said control process commands for controlling said controller process to execute particular controller functions; and directing said sequential tool commands for controlling said sequential tools to at least one of said sequential tools.

9. The method of claim 8 wherein said step of directing said sequential tool commands further comprises the step of defining a particular sequential tool to which the sequential tool command is directed using a control process command.

10. The method of claim 9 wherein said defining step further comprises the step of defining a group of said particular sequential tools to which the sequential tool command is directed using a control process command.

11. The method of claim 8 wherein said step of directing said control process commands further comprises the step of attaching, in response to a control process command, said sequential tool to said parallel user program.

12. The method of claim 8 wherein said step of directing said control process commands further comprises the step of detaching, in response to a control process command, said sequential tool from said parallel user program.

13. The method of claim 6 wherein said issuing step further comprises the step of issuing, from at least one of said nodes, a "client" call that invokes a "fork" system call to produce a parent process and a child process, wherein the parent process blocks said parallel user program from executing and said child process executes a sequential tool and attaches said sequential tool to said parent process.

14. The method of claim 6 further comprising the steps of:

executing, in response to additional nodes being added to said parallel computing system, additional sequential tools on each additional node; and connecting said additional sequential tools to said controller process.

* * * * *